United States Patent [19]

Wilson

[11] 4,143,726

[45] Mar. 13, 1979

[54] VARIABLE FREQUENCY LOAD PLATFORM AND LOAD LIMIT SWITCH

[76] Inventor: John T. R. Wilson, 736 Lynnhaven La., La Canada Flintridge, Calif. 91011

[21] Appl. No.: 892,303

[22] Filed: Mar. 31, 1978

[51] Int. Cl.$^2$ ............................................. G01G 3/14
[52] U.S. Cl. ........................ 177/210 FP; 177/DIG. 5
[58] Field of Search ................. 177/210 FP, 210 EM, 177/211, DIG. 5

[56] References Cited

U.S. PATENT DOCUMENTS

| | | | |
|---|---|---|---|
| 4,039,935 | 8/1977 | Wilson | 324/209 |
| 4,070,900 | 1/1978 | Engels | 177/210 FP X |

*Primary Examiner*—George H. Miller, Jr.

[57] ABSTRACT

A load platform with multiple stress sensitive magnetic member supports is disclosed in which the frequency of an electrical output signal is proportional to the applied platform load. This device consists of multiple magnetic stress sensitive members in which mechanical stress is induced by the platform load and a magnetic multivibrator constructed so the stress sensitive magnetic characteristics of the stress members are the principal frequency determining elements of the magnetic multivibrator. Also disclosed are various stress member loading configurations, a laminated stress member, and methods for zero-load, linearity, and scale factor adjustments in the variable frequency transducers. Also disclosed is an adjustable frequency-sensitive switch which can be used as a load switch.

11 Claims, 11 Drawing Figures

VARIABLE FREQUENCY LOAD PLATFORM AND LOAD LIMIT SWITCH

This invention relates to variable frequency load cells, load platforms, load switches, frequency-sensitive switches, weighing scales, methods for zero-load, linearity, and full scale adjustments of variable frequency load cells, and the generation of error signals in variable frequency control systems.

One object of this invention is to provide a load platform with load cell which will resist shifting its characteristics due to mechanical shock or vibration. This contrasts with strain gauge load cells in which resistance strain gauges are bonded to the stressed member and which shift characteristics when the bond becomes degraded. A second object of this invention is to provide a load platform that can be placed on a support such as a truck bed or on the ground or on a specially prepared foundation, or, in small sizes, on tables or benches to determine the weight of objects placed on the platform. A third object of this invention is to provide a load platform with load cell in which the frequency of the output signal is proportional to the applied load. A fourth object of this invention is to provide a load platform supported by a load cell consisting of multiple tensile stressed members in which the output signal frequency is proportional to the sum of the stresses in each stress member. A fifth object of this invention is to provide a load platform supported by a load cell consisting of multiple compressive stressed members in which the output signal frequency is proportional to the sum of the stresses in each stress member. A sixth object of this invention is to provide a multiple stress member load platform in which the effect of a given small load change at any load level at any location on the load platform will cause the same frequency change in the output signal. A seventh object of this invention is to provide a load platform and load cell with several volts output signal, microinches of displacement, low power consumption, high resolution, and good repeatability. An eighth object of this invention is to provide methods of zero and full-scale adjustment for a variable frequency load cell and load platform. A ninth object of this invention is to provide a frequency-sensitive switch. A tenth object of this invention is to provide a load platform with one or more adjustable, frequency-sensitive switches which can be used as adjustable load switches.

The variable frequency load platform with load limit switches will be described by referring to FIGS. 1 through 9.

Figure 1:
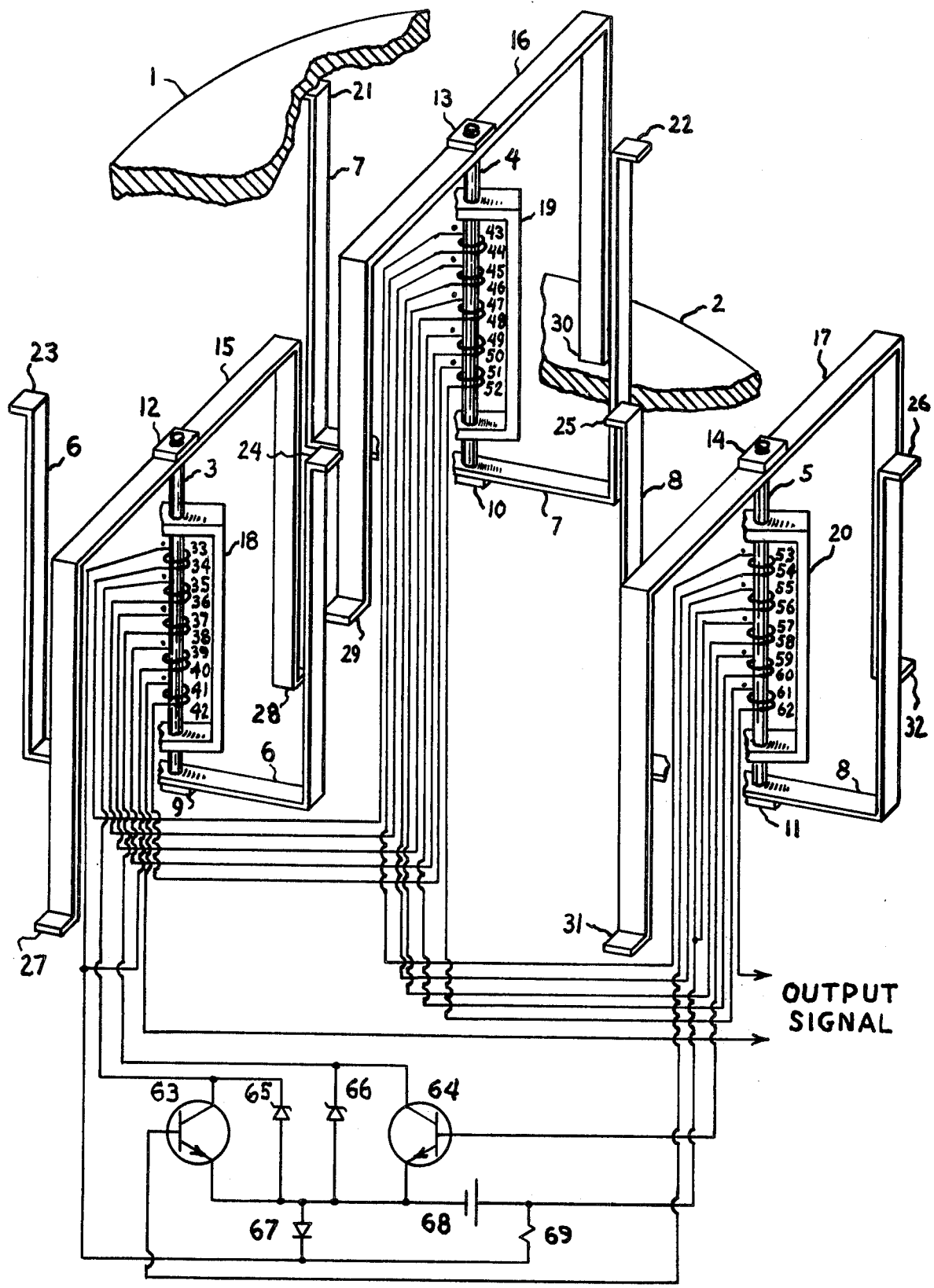
FIG. 1 is a diagram of the variable frequency load platform with multiple stressed member load cell.

The variable frequency load platform with multiple stressed members, as shown in FIG. 1, operates as follows. The load is placed on plate 1 to force plate 1 downward toward plate 2. The load causes tensile stresses to be induced in magnetic stress sensitive members 3, 4, and 5. The force is transmitted from the plate 1 to the lower ends of members 3, 4, and 5 by bails 6, 7, and 8 respectively which are attached to plate 1 and nuts 9, 10, and 11 threaded to the lower ends of members 3, 4, and 5 respectively. The force is transmitted through members 3, 4, and 5 to their upper ends from which it is coupled through nuts 12, 13, and 14 respectively into bails 15, 16, and 17 respectively attached to baseplate 2 and thereby the force reaches baseplate 2. The members 3, 4, and 5 divide the compressive load applied between plates 1 and 2; each member carries a portion of the load and the sum of the loads in the members equals the applied load. The load must be applied so all the members are in tension; none of the members are allowed to be in compression. The force is restricted to be within a circle on plate 1 defined by the stress members 3, 4, and 5 axes intersection points with plate 1. The stress sensitive members 3, 4, and 5 each have an unstressed magnetic yoke 18, 19, and 20 respectively, completing a closed magnetic flux path from near one end of each member to near the other end of each member through standard fit joints between each member and its yoke. The magnetic members and the yokes may be laminated to reduce the core losses and improve the transducer linearity. Each member has a multiple winding placed around it which inductively links the closed magnetic flux path involving that member. The windings on each member are connected in series with corresponding windings on the other members, and these windings are connected to form a magnetic multivibrator. The detailed connections are as follows: windings 33–34, 35–36, 37–38, 39–40, and 41–42 inductively link the flux path of member 3 and yoke 18; windings 43–44, 45–46, 47–48, 49–50, and 51–52 inductively link the flux path of member 4 and yoke 19; windings 53–54, 55–56, 57–58, 59–60, and 61–62 inductively link the flux path of member 5 and yoke 20. The windings 41–42, 51–52, and 61–62 are connected in series-additive and provide the output signal from the magnetic multivibrator; the frequency of the output signal is proportional to the compressive load applied between plates 1 and 2. Each load is measured as a unique frequency and there is a continuum of unique frequencies for a continuum of loads. The major portions of plates 1 and 2 are shown removed in FIG. 1 to more clearly show the other elements and their interrelationship. Plate 1 is connected to the bail ends 21, 22, 23, 24, 25, and 26; plate 2 is connected to the bail ends 27, 28, 29, 30, 31, and 32.

The magnetic multivibrator may be any of numerous configurations (described in the literature) based on the concept described by Uchrin and Taylor in "A New Self-Excited Square-Wave Oscillator", Proceedings of the Institute of Radio Engineers, Volume 43, page 99, 1955. FIG. 1 shows the magnetic multivibrator with NPN transistors 63 and 64; however, the multivibrator may be constructed using PNP transistors with the appropriate battery and diode polarity changes. The magnetic multivibrator connections shown in FIG. 1 are noted for minimizing the effects of ambient temperature on the frequency of oscillation.

This invention is configured so the magnetic characteristics of the three stress-sensitive load members 3, 4, and 5 are the major determinants of the multivibrator frequency, which is then correlated with the load applied to plate 1. The other determinants of multivibrator frequency held fixed are: the DC voltage and the number of turns per winding of any particular load platform transducer. The load versus frequency characteristic of the three-member load platform is made linear in the range of operation so that a given load positioned on plate 1 near any of the three members causes the same frequency change in the magnetic multivibrator output signal. Further, the change in frequency per unit load change is made the same throughout the load range of the weighing platform and transducer. These characteristics are achieved by making the stressed members, their windings, and flux paths identical, and by operating the stress members in their linear region. These characteristics make it possible to linearly add the stress effects in each member in determining the output frequency of the magnetic multivibrator, even though the stress in each member is not identical because of non-symmetrical loading. Because of this feature of the invention a load may be applied anywhere within a circle drawn through the platform loading application points for the three members and the load will automatically be indicated as the frequency of the magnetic multivibrator output signal. The loads on each of the members 3, 4, and 5 may be different, but the loads will be added together by the magnetic multivibrator to determine the output frequency. The magnetic multivibrator measures the mechanical stress level in each member as the magnetic characteristics of that member and the total of all the members' magnetic characteristics determines the multivibrator frequency. The unstressed magnetic characteristics of each stress member and each yoke are very nearly identical for any given load range platform. With variously stressed members due to non-symmetrical loading, the magnetic characteristics of each stress member reach magnetic saturation conditions at different times, and the applied voltage continuously redivides between the remaining unsaturated stress members until they all reach the half-cycle-reversal flux saturation level and the multivibrator half-cycle in that flux polarity direction is ended and the multivibrator half-cycle in the opposite flux polarity direction begins. This same technique is applicable to more than three members; four members is another favored combination because of the ease of designing with and the stability of a rectangular load platform.

The magnetic multivibrator consists of the transistors 63 and 64, the diode 67, the resistor 69, the zener diodes 65 and 66, the voltage source 68, the windings 33–34, 35–36, 37–38, 39–40, 41–42, 43–44, 45–46, 47–48, 49–50, 51–52, 53–54, 55–56, 57–58, 59–60, and 61–62, the magnetic stress members 3, 4, and 5, and the magnetic yokes 18, 19, and 20. The electrical connections of these components to form the magnetic multivibrator are shown in FIG. 1; also, the relative polarity of the windings are indicated by the dots near the terminals of the same polarity. The diode 67 is for temperature compensation; the resistor 69 is for self-starting the oscillation; the zener diodes 65 and 66 are for voltage spike protection of the transistors 63 and 64 respectively. The windings 33–34, 43–44, and 53–54 are connected series-aiding between the base of transistor 63 and the diode 67 cathode; these windings are the source of voltage causing the transistor 63 base current once oscillations have started. The windings 35–36, 45–46, and 55–56 are connected series-aiding between the collector of transistor 63 and the positive terminal of voltage source 68; these windings conduct the collector current of transistor 63. The windings 37–38, 47–48, and 57–58 are connected series-aiding between the collector of transistor 64 and the positive terminal of voltage source 68; these windings conduct the collector current of transistor 64. The windings 39–40, 49–50, and 59–60 are connected series-aiding between the base of transistor 64 and the cathode of diode 67; these windings are the source of voltage causing the transistor 64 base current once oscillations have started.

Figure 5:
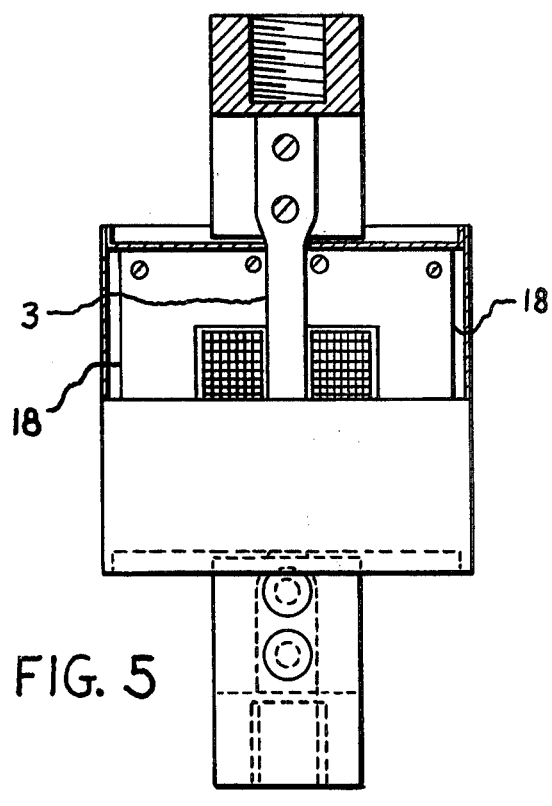
FIGS. 5 and 6 show front half-section and side views of a single laminated load stress member and laminated yoke of a variable frequency load platform transducer.
Figure 6:
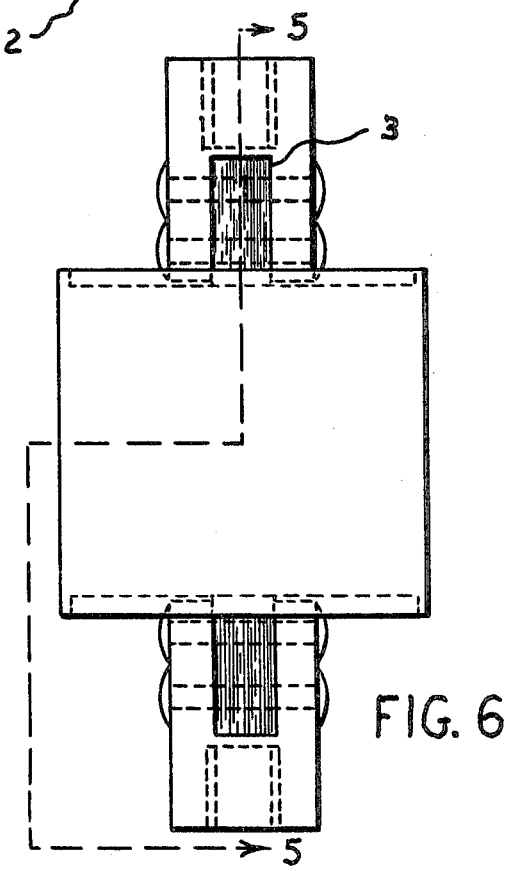

The member-to-bail attachment means shown in FIG. 1 are nuts threaded onto the solid members after the members pass through holes in the bails. When the members are laminated, as shown in FIGS. 5 and 6, adapter pieces attach to the laminated members with rivets or pins and to the bails with externally threaded members capable of accepting nuts as shown in FIG. 1.

Figure 2:
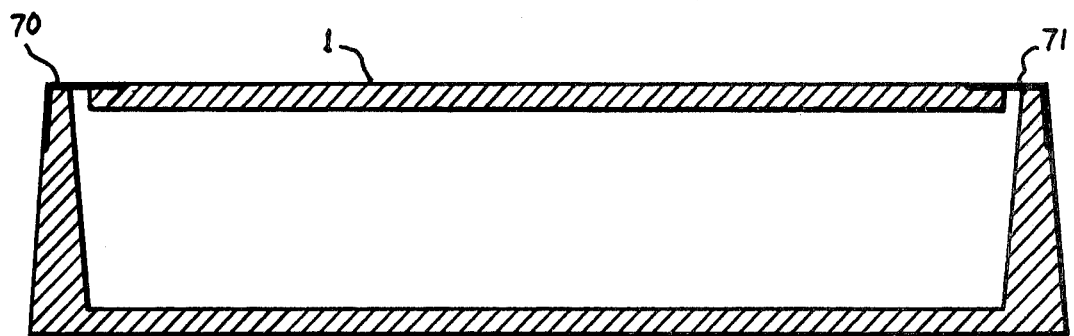
FIG. 2 is a sectioned view of a variable frequency load platform showing only the baseplate, load plate, and lateral constraints.
Figure 3:
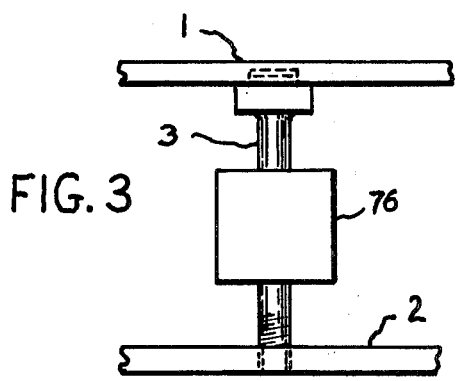
FIG. 3 shows a single, compressively stressed load member of a variable frequency load platform transducer.

The FIG. 2 shows the method of laterally constraining the load plate 1 with respect to the baseplate 2. The lateral constraints 70 and 71 are representative only; three or more constraints, equally spaced around the load plate 1, are needed to provide the desired lateral constraint. The FIG. 2 is a sectional view of a variable frequency load platform with everything removed except the load plate 1, the baseplate 2, and two lateral constraints: 70 and 71. The lateral constraints 70 and 71 are thin flexure members which are practically rigid along their major axes, but are easily flexed perpendicular to the major axes. Thus, the flexure members provide lateral constraint for the load plate 1, but do not reduce the loads applied to the magnetic stress members placed between plates 1 and 2 as shown in FIGS. 1, 3, or 4.

The FIG. 1 shows three stress members supporting the load platform which are loaded vertically and in tension. These three supporting members of the plate 1 can each be alternately configured to support the load in compression as shown singly in FIG. 3. A further alternate support method with the stress member in tension is shown singly in FIG. 4. The FIG. 3 shows only a single stress member 3 which is directly loaded vertically and operates in compression. The FIG. 3 stress member 3 passes through the element 76 which contains a yoke 18 and windings the same as shown in FIG. 1 for one stress member. The load applied to plate 1 of FIG. 3 bears downward on stress member 3, which is supported by baseplate 2, and thus member 3 is compressed.

Figure 4:
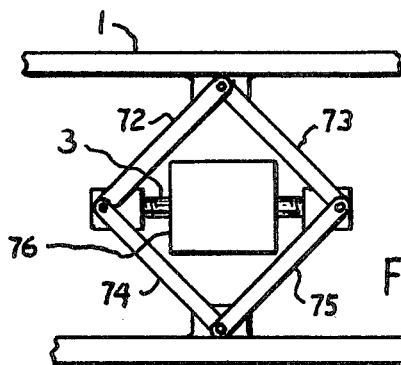
FIG. 4 shows a single, tensile stressed member of a variable frequency load platform transducer with linkages to translate compressive stresses to tensile stresses.

The FIG. 4 shows a single stress member 3 loaded in tension horizontally by means of a linkage. The compressive load is applied to plate 1 forcing it toward plate 2; the linkage members 72, 73, 74, and 75 translate the compressive load to a tensile load on the stressed member 3. The FIG. 4 stress member 3 passes through the element 76 which contains a yoke 18 and windings the same as shown in FIG. 1 for one stress member.

The FIGS. 5 and 6 show front half-section and side views of a single stress member load cell with a laminated stress member 3, performing the function of member 3 or 4 or 5 of FIG. 1, and a laminated yoke 18, performing the function of yoke 18 or 19 or 20 of FIG.

1. The laminations reduce magnetic leakage, hysteresis, and eddy current losses, and thereby provide greater linearity, repeatability, and resolution of the output signal characteristics and reduce the power consumption of the load cell. The laminations are electrically insulated from one another by a surface metal treatment or insulating varnish. The load platform shown in FIG. 1 can be constructed of three laminated load cells of the type shown in FIGS. 5 and 6. The load-end fittings shown in FIGS. 5 and 6 are female threads, but they may be male threads or one or both ends may be equipped with a button for compressive loading.

Figure 7:
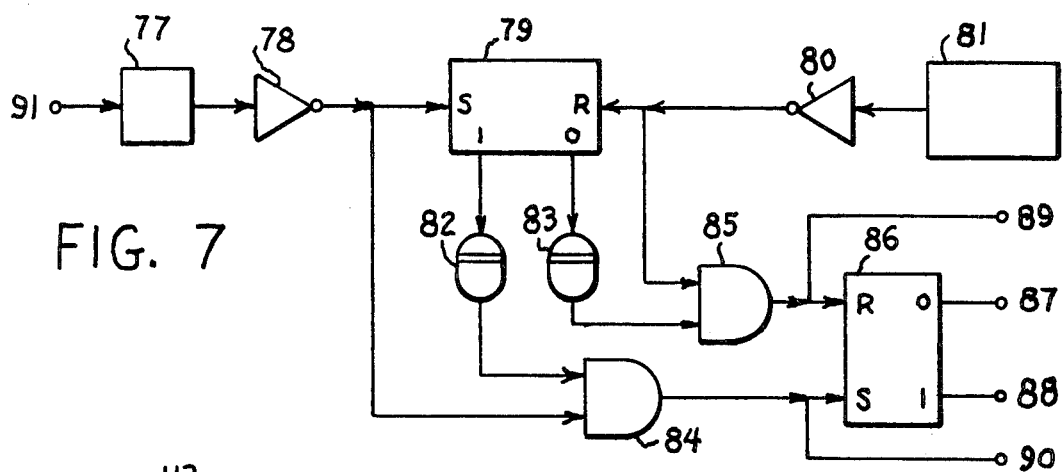
FIG. 7 shows a logic diagram of an adjustable, frequency-sensitive switch, which is used as a load switch on the variable frequency load platform.

The FIG. 7 shows a logic diagram of an adjustable, frequency-sensitive switch. The switch is set when a switch input signal frequency is greater than a reference signal frequency. The switch is reset when the switch input signal frequency is less than the reference signal frequency. The variable frequency load cell is configured so that low frequency corresponds to zero or small loads and high frequency corresponds to full scale or large loads. Thus, the load switch is reset for loads below the switch setting, and set for loads which exceed the switch setting. The switch operates as follows. An adjustable, reference-frequency pulse oscillator 81 is set to a frequency or pulse repetition rate within the expected range of the load switch input signal 91, which is the output signal from a variable frequency load platform transducer. The load switch variable frequency input signal 91 is differentiated by function block 77, and clipped, amplified and inverted by inverter 78; the signal from 78 is then used to set flip-flop 79 and drive one input of AND gate 84. The reference-frequency pulses from 81 are amplified and inverted by inverter 80 and used to reset flip-flop 79 and drive one input of AND gate 85. The set or reset condition of the load switch is determined by the set or reset condition of flip-flop 86 of FIG. 7. The condition of flip-flop 86 is determined by the following conditions: (1) reset, if the flip-flop 79 zero (0) or reset output signal, delayed-by-83 is present when a reference-frequency pulse is applied to AND gate 85, and (2) set, if flip-flop 79 one (1) or set output signal, delayed-by-82 is present when a load cell frequency pulse is applied to AND gate 84. This switch makes transitions at a speed inversely proportional to the frequency difference between the reference-frequency and the variable frequency load switch input signal. This characteristic of the switch can be used in control systems to provide a latent period before or after a switch transition to prevent undesirable cycling. A variable frequency load platform can be equipped with these load switches at high and low load settings to control the filling of containers. A load platform under a container being filled can be provided with two or more load switches to provide stepped reductions in the filling rate of the container as the desired-fill level is approached to avoid overfilling the container.

Figure 8:
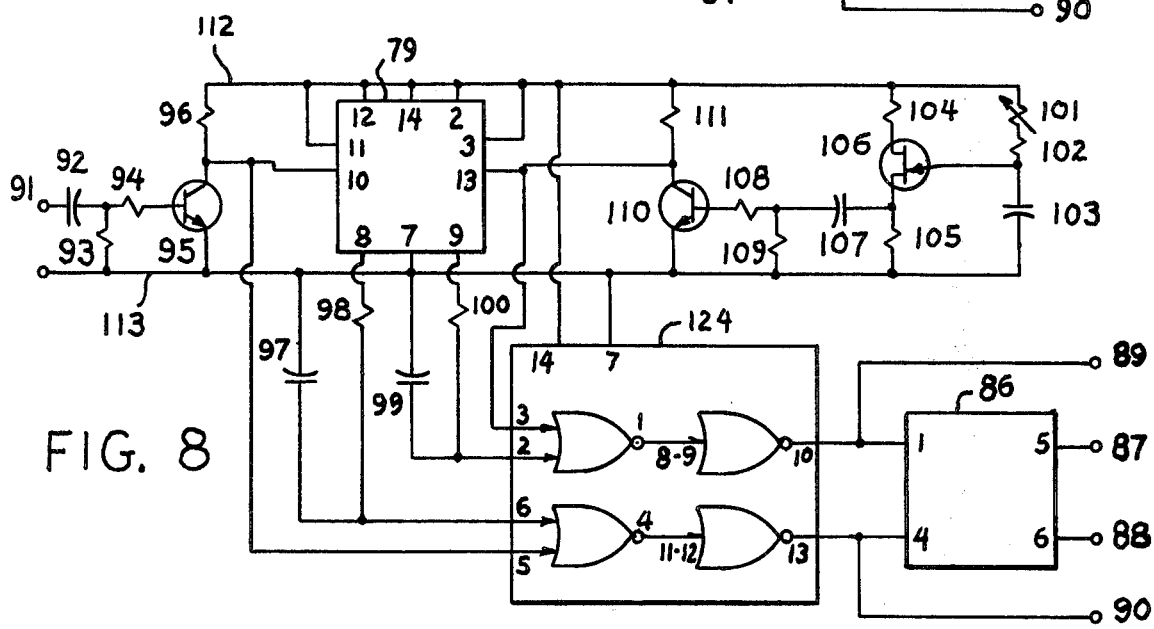
FIG. 8 is a circuit schematic diagram of an adjustable, frequency-sensitive switch, such as is shown in FIG. 7.

The FIG. 8 is a circuit schematic of the adjustable, frequency-sensitive switch shown in block diagram in FIG. 7. The part functional groupings in terms of the FIG. 7 logic and functional blocks are as follows. The variable frequency input signal is connected between terminal 91 and return line 113, which connect the signal to capacitor 92 and resistor 93, and the differentiated signal appears across resistor 93. The differentiated signal is connected to resistor 94, transistor 95, and resistor 96 connected to a positive 5 volt DC line 112; these components clip, amplify, and invert the differentiated signal, performing the function of block 78 of FIG. 7. The flip-flops 79 and 86 are each one-half of a 54L74, dual D-type flip-flop integrated circuit; the numbers within blocks 79 and 86 in FIG. 8 are the pin numbers of a 54L74. The reference-frequency pulse oscillator 81 consists of capacitor 103, resistors 102, 104, and 105, rheostat 101, and unijunction transistor 106. The inverter 80 consists of capacitor 107, resistors 108, 109, and 111, and transistor 110. The AND gates 84 and 85 are each constructed from two NOR circuits of a 54L02, which is a quad 2-input NOR integrated circuit 124; the numbers within the block 124 are the pin numbers of a 54L02. The desired AND function of the gates 84 and 85 can also be achieved with a NOR circuit and an inverter, and this is how the function is achieved in FIG. 8 by using one-fourth of the 54L02 for the NOR circuit and another one-fourth of the 54L02 as the inverter. The flip-flop-79-reset-delay 83 is an RC delay consisting of capacitor 99 and resistor 100; the flip-flop-79-set-delay 82 is also an RC delay consisting of capacitor 97 and resistor 98. The line 113 is the input signal and output signal return line and also the 5 volt DC return line.

Figure 9A:
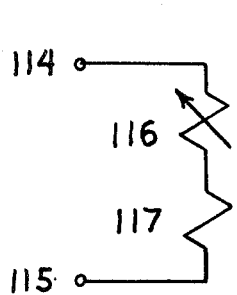
FIG. 9 shows different circuits to preadjust the magnetic multivibrator.
Figure 9B:
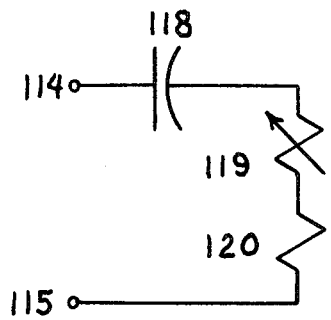
Figure 9C:
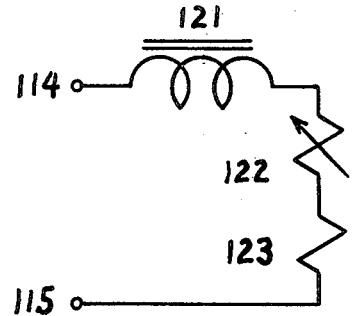

The FIGS. 9a, 9b, and 9c show different circuits to load the magnetic multivibrator and thereby adjust and compensate for normal manufacturing variations and zero or tare weight in building and using these variable frequency load platforms and load cells. Each of these circuits is connected in use at the terminals 114 and 115 to the output signal connections of FIG. 1. The loading effects of these circuits cause changes in the magnetic multivibrator frequency; the loading effects can be adjusted by the rheostats 116, 119, and 122. The FIG. 9a is effective for adjusting multivibrator frequency over the entire frequency range of the transducer; this circuit can be used for scaling or adjusting the scale factor of the load platform. The FIG. 9b circuit is more effective in adjusting the high frequencies than the low frequencies; so, it can attenuate the load scale factor at high frequencies more than at low frequencies. The FIG. 9c circuit loads the low frequencies more than the high frequencies; so, it can attenuate the load scale factor at low frequencies more than at high frequencies. These FIG. 9 circuits embodying resistors, rheostats, capacitors, and inductors are representative of filter networks which can be used to provide zero, scale factor, and linearity adjustments during the manufacture and use of the multiple stress member load platform transducer or single stress member load cells.

I claim as my invention the following:

1. A variable frequency load platform for weighing objects consisting of multiple magnetic stress members in which mechanical stress is induced by the platform load and in which the members magnetic characteristics are changed by said mechanical stress, stress members mechanical stress application means consisting of a load platform plate connected only to one end of said stress members and a baseplate means connected to the other end of said stress members, multiple magnetic yokes each completing one closed magnetic flux path through one said stress member from near one end of one said stress member to near the other end of said one member through standard fit joints between said one member and said one yoke, multiple multiple winding means in which one multiple winding means inductively links one flux path means, a magnetic multivibrator utilizing said multiple multiple winding means in which the frequency of oscillation is principally determined by the time required to drive magnetic flux in synchronism through each said flux path and reciprocally between one polarity near-maximum flux level and the opposite polarity near-maximum flux level, and an output signal winding means inductively linking each said flux path and series-additive connected for deriving an induced output signal from said multivibrator in which the fundamental frequency represents the sum of the loads applied to said multiple members and thus the load applied to said platform.

2. A variable frequency load platform as in claim 1 except the multiple stress members and associated yokes are laminated.

3. A variable frequency load platform as in claim 1 except with an additional winding means inductively linking each said flux path which is connected to drive in parallel an adjusting means rheostat with series fixed resistor and a further adjusting means rheostat in series with a fixed resistor and a fixed capacitor.

4. A variable frequency load platform as in claim 1 except with an additional winding means inductively linking each said flux path which is series-additive connected to drive in parallel an adjusting rheostat with series fixed resistor and a further adjusting means rheostat in series with a fixed resistor and a fixed inductor.

5. A variable frequency load platform as in claim 1 except with an additional winding means inductively linking each said flux path which is connected to drive an adjustable frequency sensitive network composed of resistors, capacitors, inductors, and rheostats which allows adjusting the load platform output signal frequency versus load characteristics of zero-load frequency, linearity, and scale factor.

6. A variable frequency load platform as in claim 1 except connected to the output signal winding means in parallel are an adjusting means rheostat with series fixed resistor and a further adjusting means rheostat in series with a fixed resistor and a fixed capacitor.

7. A variable frequency load platform as in claim 1 except connected to the output signal winding means is an adjustable frequency sensitive filter network means composed of resistors, capacitors, inductors, and rheostats to allow adjusting the load platform output signal frequency versus platform load characteristics of zero-load frequency, linearity, and scale factor.

8. A variable frequency load platform as in claim 1 in which the load platform is constrained from lateral movement by multiple members between the load platform and the baseplate which are rigid laterally but flexible in the direction of platform loading.

9. A variable frequency load platform for weighing objects as an electrical output signal of unique fundamental frequency for each load state consisting of a load platform supported by multiple magnetic stress members in which mechanical stress is induced by the platform load and in which said members magnetic characteristics are changed reversably by said mechanical stress, multiple magnetic yokes each completing one closed magnetic flux path in one said magnetic member from near one end of said member to near the other end of said magnetic member through standard fit joints between said magnetic member and its associated yoke, first and second winding means inductively linking each said flux path, a unidirectional and constant source of voltage with two terminals, a pair of bipolar transistors of like type and polarity each having base, emitter, and collector electrodes, said source of voltage connected between the emitter electrode and the base electrode of each of said transistors through a portion of said first winding means linking each flux path, the emitter electrode of each of said transistors being connected to one of said terminals, the collector electrode of each of said transistors being connected to the other of said terminals through a portion of said second winding means linking each flux path, said first winding means portions being series-additive connected to apply voltages induced therein between the base electrode and the emitter electrode of each of said transistors, each of said transistors being reciprocally and alternately rendered into a cut-off and conducting current condition in response to said first winding induced voltages, each of the transistors being biased so as to transfer from one to the other of said conducting conditions in response to the voltage induced in said first winding means portions upon each occurrence of the maximum magnetic flux level permitted through said flux paths by said mechanical stresses, and a third winding means inductively linking each said flux path and connected series-additive from which said electrical output signal is obtained.

10. A variable frequency load platform as in claim 2 except additionally connected across the first winding means is an adjusting frequency sensitive network consisting of resistors, capacitors, inductors, and rheostats which allow adjusting the load platform output signal frequency versus platform load characteristics of zero-load frequency, linearity, and scale factor.

11. A variable frequency load platform for weighing objects as an electrical output signal of unique fundamental frequency for each load state consisting of a load platform supported by multiple magnetic stress members in which mechanical stresses are induced by the platform load and in which said members magnetic characteristics are changed reversably by said mechanical stresses, multiple magnetic yokes each completing one closed magnetic flux path in one said magnetic member from near one end of said member to near the other end of said magnetic member through standard fit joints between said magnetic member and its associated yoke, first and second winding means inductively linking each said flux path, a unidirectional and constant source of voltage with two terminals, a pair of bipolar transistors of like type and polarity each having base, emitter, and collector electrodes, the emitter electrode of each of said transistors being connected to one of said terminals, the collector electrode of each of said transistors being connected to the other terminal through a portion of said first winding means, an oscillation-starter resistor connected from the collector-related terminal to each base electrode through a portion of said second winding means, rectifier means for bypassing said resistor said rectifier connected anode to said emitters and cathode to resistor-second-winding junction, said second winding means being connected series-additive to apply voltages induced therein between the base electrode and the emitter electrode of each of said transistors, each of said transistors being reciprocally and alternately rendered into a cut-off and conducting current condition in response to the voltage induced in said second winding means portions, each of the transistors being biased so as to transfer from one to the other of said conducting conditions in response to the voltage induced in said second winding means portions upon each occurrence of the maximum magnetic flux level permitted through said flux paths by said mechanical stresses, and a third winding means inductively linking each said flux path and connected series-additive from which said electrical output signal is obtained.

* * * * *